A. J. MARTIN.
GRAIN-DRILLS.
No. 195,144. Patented Sept. 11, 1877.
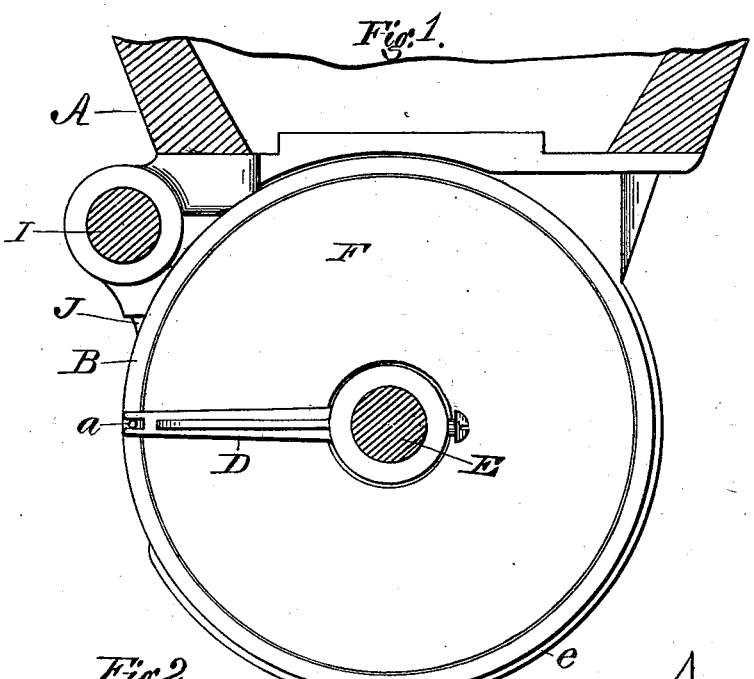
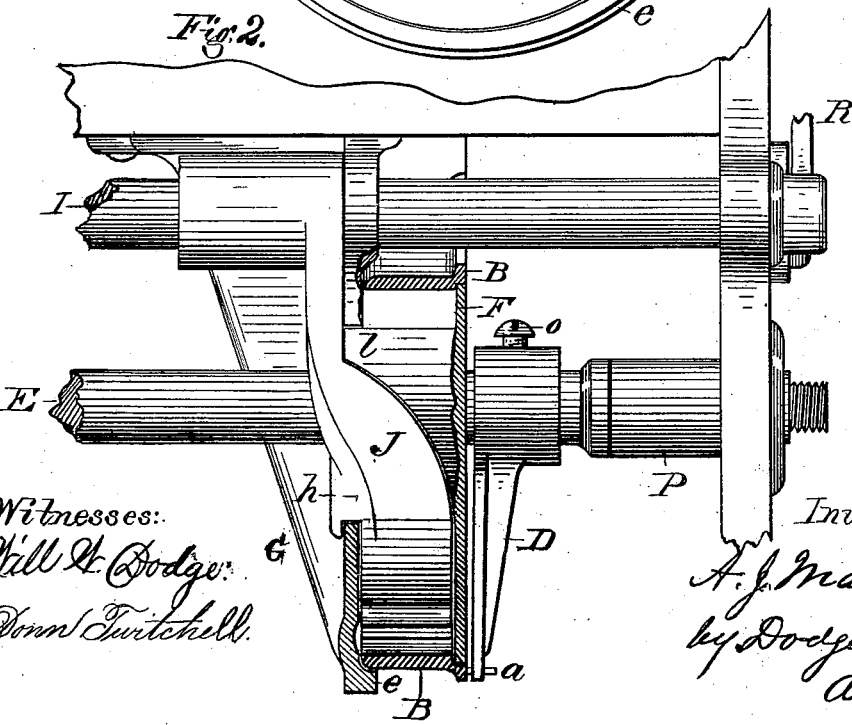

A. J. MARTIN.
GRAIN-DRILLS.
No. 195,144. Patented Sept. 11, 1877.
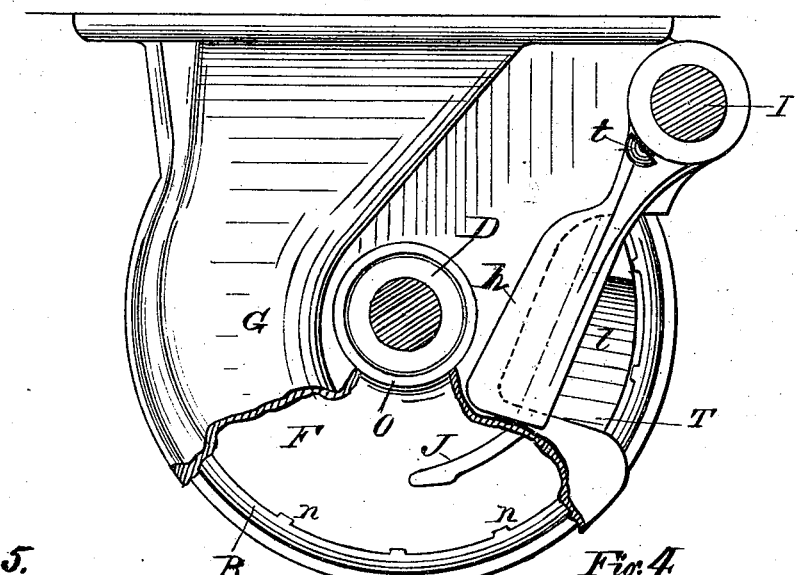
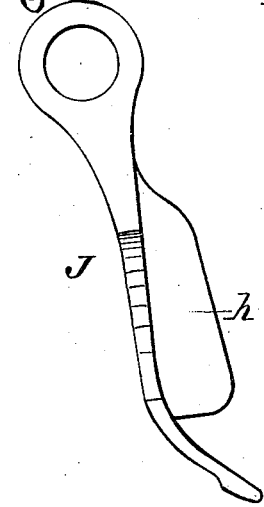
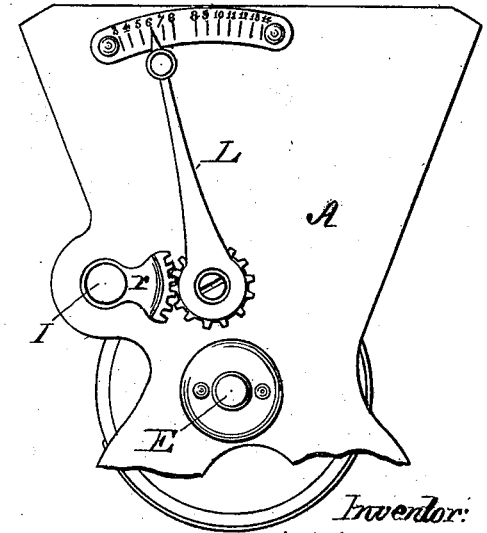

UNITED STATES PATENT OFFICE.

ANDREW J. MARTIN, OF SPRINGFIELD, OHIO, ASSIGNOR TO P. P. MAST & CO., OF SAME PLACE.

IMPROVEMENT IN GRAIN-DRILLS.

Specification forming part of Letters Patent No. 195,144, dated September 11, 1877; application filed May 6, 1875.

*To all whom it may concern:*

Be it known that I, ANDREW J. MARTIN, of Springfield, in the county of Clarke and State of Ohio, have invented certain Improvements in Grain-Drills, of which the following is a specification:

My invention relates to grain-drills; and the invention consists of a novel device for feeding the grain from the hopper, and a device for regulating the supply or quantity, as hereinafter more fully described.

Figure 1 is a side view of the feed-wheel. Fig. 2 is a rear elevation, a portion being shown in section. Fig. 3 is a reverse side view, with a portion broken away to show the interior. Fig. 4 is an end view, showing the regulating-lever; and Fig. 5 is a view of a part detached.

In constructing my improved feed for grain-drills I make a feed-cup, which consists of two vertical sides, F and G, connected at their center by a hub, O, as shown in Fig. 3. The side F is a plain circular disk, while the side G has an enlargement or swell on its side extending from the top down along in front of the hub O, and terminating near the bottom, thus forming a channel or throat, down which the grain is to pass from the hopper A, the side G being provided with a flange along its upper edge, by which it is secured to the under side of the hopper, as shown in Fig. 2, and also with an opening, T, through which the grain is fed out, as shown in Fig. 3. The side F has also, on its inner face, a projection, $l$, which curves over toward the side G at its upper end, as shown in Fig. 2, this projection being located opposite the orifice T, and extending from the outer edge inward about half-way to the hub at its lower end, and growing gradually narrower toward its upper end. The two sides F and G are made separate, the hub O being cast on one of them, and by this hub they are subsequently united.

The device which carries and feeds the grain out through the orifice T is an annular rim, B, which, as shown in Fig. 2, is fitted between the stationary sides F and G, so as to revolve loosely, it resting on a lip, $e$, formed on the inner edge of plate G and upon the periphery of the disk F, it being recessed or shouldered where it comes in contact with the disk F, to prevent lateral displacement. This rim B is propelled by an arm, D, secured to the main shaft E, as shown in Figs. 1 and 2, the outer end of the arm D being slotted, so as to engage with a pin, $a$, projecting from the edge of the rim. The rim B has a series of transverse ribs, $n$, on its inner face, as shown in Fig. 3, to assist in moving the grain.

In order to regulate the quantity of grain fed out by the moving rim, I provide a gate, J, the form of which is shown in Fig. 5, it being of such a width as to permit it to be inserted and moved freely between the sides F and G, as shown in Fig. 2. This gate is inserted through the orifice T, and has its edge curved to fit against the face of the projection $l$, as shown in Fig. 2, its free end projecting downward in the space between the rim B and the hub O, as shown in Fig. 3. It is secured at its upper end to a shaft, I, as shown in Figs. 2 and 3, so that as said shaft is turned the gate J will be swung in toward the hub O, or outward toward the rim B, as may be desired, it having a lip, $h$, standing at right angles to its body, which fits against the outer face of the side G, so as to cover the orifice T as it is moved outward.

For the purpose of operating this gate J its shaft I extends out through the end support of the hopper A, and has secured to it a segmental rack, $r$, which engages in a corresponding rack or gear attached to a lever, L, the upper end of which is arranged to move along a graduated arc, which has on it marks to indicate the quantity of grain, as shown in Fig. 4.

In order to be able to adjust the gages J in reference to the openings in the several seed-cups so that the whole series of gages shall operate with exact uniformity, and, when moved by the rock shaft, shall all move so as to make the seed-channels in all the cups precisely alike, and thus feed the same quantity from each, they are secured to the rock-shaft I in such a manner that, after they are all mounted and in place, they can each be adjusted on the shaft as may be found necessary. This, as shown in Fig. 3, may be done by means of a set-screw, $t$, or by any equivalent means. By this means each of the gages J, after they are mounted and in place, can be loosened on the shaft I, so as to rest loosely against the inner face of the rim B in the position they will occupy when the flow of grain is entirely cut off. Then, by turning the set-screws $t$ so as to clamp each gage firmly to the shaft I, they will all be made to move together with perfect uniformity, and, of course, will make the amount of grain fed from each seed-cup the same.

This adjustment of the gages upon their shaft also enables them to be set so as to compensate for any irregularity that there may be in the setting of the seed-cups originally, or that may arise from subsequent swelling or warping of the hopper to which they are attached, or from any slight irregularities in the casting of the cups.

This idea of securing the gages J directly on the rock-shaft, and making them adjustable thereon, I do not claim as my invention; but only when these features are combined with a wheel and case of the kind shown in this application.

From this description it will be seen that the grain is fed, by the moving rim B, out at the opening T, while the sides F and G both remain stationary; and that there is a continuous channel extending around between the hub and the rim, through which the grain may pass freely.

When the gate J has its lower end swung inward whatever grain is carried up between it and the rim will pass out at the opening T, and whatever grain is between the gate and the hub can pass freely along the channel, and be carried over to the front of the hub.

The gate J also prevents the grain from being forced back over the hub and out at the opening, the only grain that can pass out of the opening being that which passes upward between the gate and the rim.

It will be seen that by this construction the quantity of grain can be regulated to any desired amount without any change in the speed of the main shaft E, thereby dispensing with all change of gear, which is very important, as it not only cheapens the construction of the machine, but lessens the liability of breakage and of its getting out of order. Moreover, as the feed is regulated entirely by the adjustment of the gate, it is capable of finer adjustments than when effected by a change of gear, for when gear is used for this purpose the change is from a certain fixed quantity to a certain other fixed quantity; whereas by this mode of regulating it the feed can be adjusted at any intermediate point desired.

It will be seen that, owing to the curved form of the free end of the gate J, and the position and manner in which it is pivoted and works within the case, its lower or free end is at all times nearly concentric with the outer rim B; and that however the gate may be adjusted, the channel or throat between the gate and rim through which the grain passes is always of the same general form, or nearly so.

I am aware that a gate has been arranged with a tongue on its end projecting through the side of the case and fastened by a bolt and nut, which held it stationary when once set, and therefore I do not claim such a device; but I am not aware that a grain-drill has before been made in which the feed-wheels were provided with pivoted gates adapted to be held in position as set by the mechanism or devices used for operating them, whereby the entire series of gates could be simultaneously and uniformly operated by a single movement, as in this case.

Having thus described my invention, what I claim is—

1. A feed device for grain-drills, consisting of an independent moving rim, B, in combination with fixed or stationary sides, substantially as described.

2. The gate J, arranged to operate substantially as described, in combination with the moving rim B and the stationary sides, for regulating the feed, as set forth.

3. A grain-feeding device, consisting of a case or cup having a delivery-opening in its side, a moving rim for feeding out the grain independently of a vertical wheel, and a device for regulating the quantity of the grain, all constructed, combined, and operating substantially as set forth.

4. The combination of a series of flanged distributing-wheels with a series of gates, operating between the flanges of said wheels and their shaft or hubs, and connected directly to an adjusting rod or shaft located outside of the periphery of said wheels, substantially as described.

5. The seed-gate formed, pivoted, and operated substantially as shown and described, whereby the form of the measuring-channel between said gate and the inner face of the flange of the distributing-wheel remains substantially the same under the various adjustments of the gate, as set forth.

6. The combination, in a grain-drill, of the shaft E, arm D, and rim B with the stationary sides F and G, substantially as described.

7. The converging seed-channel, delivering the grain in a direction toward the point of the seed gage or valve, and formed in the arc of a circle, of which the pivot of the seed-gage is the center, or nearly so, substantially as shown and described.

8. A feed-wheel for grain-drills having a gate or gage arranged within its channel, so that while a portion of the grain is permitted to escape from the wheel the remainder is allowed to pass freely around with the wheel, whereby it is prevented from being crushed or injured, as set forth.

ANDREW J. MARTIN.

Witnesses:
A. P. LINN COCHRAN,
ROBT. C. ROGERS.